US008946313B2

United States Patent
Adkins et al.

(10) Patent No.: US 8,946,313 B2
(45) Date of Patent: Feb. 3, 2015

(54) HYBRID PHD/PMPO POLYOLS FOR POLYURETHANE FOAM APPLICATIONS

(75) Inventors: Rick L. Adkins, Dunbar, WV (US); Brian L. Neal, Scott Depot, WV (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 57 days.

(21) Appl. No.: 13/327,879

(22) Filed: Dec. 16, 2011

(65) Prior Publication Data

US 2013/0158142 A1 Jun. 20, 2013

(51) Int. Cl.
| | |
|---|---|
| C08J 9/04 | (2006.01) |
| C08G 18/63 | (2006.01) |
| C08K 5/05 | (2006.01) |
| C08K 5/06 | (2006.01) |
| C08K 5/10 | (2006.01) |

(52) U.S. Cl.
USPC ........... 521/137; 524/728; 524/755; 524/765; 525/123; 525/127; 525/128; 525/452; 525/455

(58) Field of Classification Search
USPC .......... 524/728, 755, 765; 525/123, 127, 128, 525/452, 455; 521/137
See application file for complete search history.

(56) References Cited

U.S. PATENT DOCUMENTS

| | | |
|---|---|---|
| 3,304,273 A | 2/1967 | Stamberger |
| 3,383,351 A | 5/1968 | Stamberger |
| 3,652,639 A | 3/1972 | Pizzini et al. |
| 3,823,201 A | 7/1974 | Pizzini et al. |
| 3,850,861 A | 11/1974 | Fabris et al. |
| 3,931,092 A | 1/1976 | Ramlow et al. |
| RE28,715 E | 2/1976 | Stamberger |
| RE29,118 E | 1/1977 | Stamberger |
| 4,014,846 A | 3/1977 | Ramlow et al. |
| 4,089,835 A | 5/1978 | Konig et al. |
| 4,093,573 A | 6/1978 | Ramlow et al. |
| 4,148,840 A | 4/1979 | Shah |
| 4,172,825 A | 10/1979 | Shook et al. |
| 4,208,314 A | 6/1980 | Priest et al. |
| 4,242,249 A | 12/1980 | Van Cleve et al. |
| 4,342,840 A | 8/1982 | Kozawa et al. |
| 4,390,645 A | 6/1983 | Hoffman et al. |
| 4,391,491 A | 7/1983 | Freer et al. |
| 4,438,252 A | 3/1984 | Carroll et al. |
| 4,452,923 A | 6/1984 | Carroll et al. |
| 4,454,255 A | 6/1984 | Ramlow et al. |
| 4,458,038 A | 7/1984 | Ramlow et al. |
| 4,460,715 A | 7/1984 | Hoffman et al. |
| 4,463,107 A | 7/1984 | Simroth et al. |
| 4,550,194 A | 10/1985 | Reichel et al. |
| 4,554,306 A | 11/1985 | Carroll |
| 4,652,589 A | 3/1987 | Simroth et al. |
| 4,745,153 A | 5/1988 | Hoffman et al. |
| RE32,733 E | 8/1988 | Simroth et al. |
| 4,761,434 A | 8/1988 | Dietrich et al. |
| 4,847,320 A | 7/1989 | Lowery et al. |
| 4,997,857 A | 3/1991 | Timberlake et al. |
| 5,179,131 A | 1/1993 | Wujcik et al. |
| 5,196,476 A | 3/1993 | Simroth |
| 5,252,624 A * | 10/1993 | Milliren et al. ............... 521/117 |
| 5,292,778 A | 3/1994 | Van Veen et al. |
| 5,342,855 A | 8/1994 | Lucarelli et al. |
| 5,594,066 A | 1/1997 | Heinemann et al. |
| 5,814,699 A | 9/1998 | Kratz et al. |
| 5,990,185 A | 11/1999 | Fogg |
| 6,013,731 A | 1/2000 | Holeschovsky et al. |
| 6,143,802 A * | 11/2000 | Simroth et al. ............... 521/123 |
| 6,455,603 B1 | 9/2002 | Fogg |
| 7,160,975 B2 | 1/2007 | Adkins et al. |
| 7,179,882 B2 | 2/2007 | Adkins et al. |
| 7,674,853 B2 | 3/2010 | Albert et al. |
| 7,678,840 B2 | 3/2010 | Jenny et al. |
| 7,759,423 B2 | 7/2010 | Chauk |
| 7,776,969 B2 | 8/2010 | Adkins |
| 2004/0192795 A1* | 9/2004 | Chevalier et al. ............. 521/137 |
| 2010/0048785 A1 | 2/2010 | Schnorpfeil |
| 2010/0286299 A1 | 11/2010 | Casati et al. |

FOREIGN PATENT DOCUMENTS

| | | |
|---|---|---|
| EP | 0786480 | 7/2003 |
| EP | 0418039 | 3/2010 |
| GB | 1126025 | 9/1968 |
| GB | 20702204 A | 9/1981 |
| GB | 2102822 A | 2/1983 |
| JP | 48101494 A | 12/1973 |
| JP | 52005887 A | 1/1977 |
| WO | 9412553 | 6/1994 |
| WO | 0073364 A1 | 12/2000 |

* cited by examiner

*Primary Examiner* — Rabon Sergent
(74) *Attorney, Agent, or Firm* — N. Denise Brown

(57) ABSTRACT

This invention relates to hybrid polymer polyols. These hybrid polymer polyols comprise the free-radical polymerization product of (A) a base polyol comprising (1) a polymer modified polyol selected from (a) dispersions of polyureas and/or polyhydrazodicarbonamides in a hydroxyl group containing compound and (b) polyisocyanate polyaddition polyols, and (2) optionally, a polyol having a functionality of 2 to 6 and an OH number of from 20 to 500; (B) optionally, a preformed stabilizer; and (C) one or more ethylenically unsaturated monomers, in the presence of (D) a free-radical polymerization initiator, and (E) optionally, a polymer control agent. The present invention also relates to a process for the preparation of these hybrid polymer polyols, foams prepared from these hybrid polymer polyols and to a process for the preparation of these foams.

24 Claims, No Drawings

HYBRID PHD/PMPO POLYOLS FOR POLYURETHANE FOAM APPLICATIONS

BACKGROUND OF THE INVENTION

This invention relates to hybrid polymer polyols and to a process for the preparation of these hybrid polymer polyols. In addition, the present invention relates to a process for the preparation of polyurethane foams from these hybrid polymer polyols, and to the resultant polyurethane foams prepared from these hybrid polymer polyols.

Various types of filled polyols are known and described in the art. Filled polyols are typically stable dispersions of solid particles in a liquid base polyol. More specifically, the known filled polyols include, for example, polyisocyanate polyaddition (i.e. PIPA) polyols, polyurea and/or polyhydrazodicarbonamide (i.e. PHD) polyols and polymer (i.e. PMPO) polyols.

The basic patents relating to such polymer polyol compositions are Stamberger, U.S. Pat. Re. 28,715 (reissue of U.S. Pat. No. 3,383,351) and U.S. Pat. Re. 29,118 (reissue of U.S. Pat. No. 3,304,273). As described therein, a stable dispersion of polymer particles in a polyol can be produced by polymerizing one or more ethylenically unsaturated monomer dissolved or dispersed in a polyol in the presence of a free radical catalyst.

Since then, numerous patents have issued which describe various advances such as increasing solids contents, decreasing viscosity, enhancing stability, etc. in polymer polyols. These patents include, for example, U.S. Pat. Nos. 3,652,639, 3,823,201, 3,850,861, 3,931,092, 4,014,846, 4,093,573, 4,148,840, 4,172,825, 4,208,314, 4,242,249, 4,342,840, 4,390,645, 4,394,491, 4,454,255, 4,458,038, 4,460,715, 4,550,194, 4,652,589, 4,745,153, 4,997,857, 5,196,476, 5,814,699, 5,990,185, 6,455,603, 7,160,975, 7,179,882, 7,759,423 and Re 32,733 (reissue of U.S. Pat. No. 4,463,107).

It is known that the filled polyols are suitable isocyanate-reactive components for the preparation of polyurethane materials such as foams, elastomers, etc. The two major types of polyurethane foams are termed slabstock foams and molded foams. Slabstock foams are used in the carpet, furniture and bedding industries. Primary uses of slabstock foam are as carpet underlay and furniture padding. In the molded foam area, high resiliency (HR) molded foam is the most common type foam made commercially. HR molded foams are used in the automotive industry for a breadth of applications ranging from molded seats to energy-absorbing padding and the like. As the demand for polymer polyols has increased, and the need for better and improved properties in the polymer polyols has increased, new advances in polymer polyol technology have been achieved.

In spite of advances in reduction in viscosity and increased solids contents of polymer polyols, a need for further improvement in viscosity reduction and increase in solids content has continued to exist. In particular, there is a need for technology in polymer polyols that maximizes viscosity reduction while also providing a viable mechanism to higher solids content, while enhancing the stability of the polymer polyols.

One way of enhancing stability of polymer polyols is by the presence of a minor amount of a graft or addition copolymer formed in situ from growing polymer chains and polyol molecules. Various approaches are known in the art. These typically incorporate small amounts of unsaturation into the polyol in addition to that inherently present in the polyoxyalkylene polyols typically used in forming polymer polyols. Various patents including U.S. Pat. Nos. 3,652,639, 3,823, 201, and 3,850,861, British Patent 1,126,025 and Japanese Patent Nos. 52-005887 and 48-101494 utilize this approach. The use of "stabilizer precursors," also termed a "macromer" that contains a particular level of reactive unsaturation, is based on the expectation that during polymerization, in the preparation of the polymer polyol, adequate amounts of stabilizer will be formed by the addition polymerization of the precursor stabilizer with a growing polymer chain. U.S. Pat. Nos. 4,454,255, 4,458,038 and 4,460,715 describe the general concept of using stabilizer precursors in polymerization.

A pre-formed stabilizer (PFS) is known to be particularly useful for preparing a polymer polyol having a lower viscosity at high solids content. In the pre-formed stabilizer processes, a macromer is reacted with monomers to form a co-polymer composed of macromer and monomers. These co-polymers comprising a macromer and monomers are commonly referred to as pre-formed stabilizers (PFS). Reaction conditions may be controlled such that a portion of the co-polymer precipitates from solution to form a solid. Pre-formed stabilizers may be dispersions having low solids contents (e.g., 3 to 15% by weight). It is preferred that the reaction conditions under which pre-formed stabilizers are prepared are controlled so that the particle size is small, thereby enabling the particles to function as "seeds" in the polymer polyol reaction.

U.S. Pat. Nos. 5,196,476, 5,990,185, 6,013,731, 7,160,975 and 7,776,969 as well as EP 0786480 describe a variety of pre-formed stabilizer composition. In general, these are prepared by polymerizing a macromer and one or more ethylenically unsaturated monomers in the presence of a free-radical polymerization initiator and a liquid diluent in which the pre-formed stabilizer is essentially insoluble.

Stable dispersions of polyurea and/or polyhydrazodicarbonamides in a hydroxyl group containing compound (i.e. PHD polyols) are also known and described in the art. See, for example, U.S. Pat. Nos. 4,089,835, 4,761,434, 4,847,320 and 5,342,855. PHD polyols typically comprise the reaction product of (1) one or more organic polyisocyanates, with (2) one or more polyamines selected from the group consisting of (i) primary and/or secondary amino-group containing di- and/or polyamines, (ii) hydrazines, (iii) hydrazides and (iv) mixtures thereof. PHD polyols are known to result in polyurethane foams having improved combustion resistance.

PIPA (polyisocyanate polyaddition) polyols are another type of polymer filled polyols. U.S. Pat. Nos. 4,452,923, 4,438,252, 4,554,306, 5,292,778 and 7,674,853; GB Patents 2102822 and 2072204; WO 94/12553 and WO 00/73364; and EP 418039 describe various types of PIPA polyols and processes for preparing these PIPA polyols. PIPA polyols are generally the polyaddition reaction products of a polyisocyanate and a low molecular weight compound having a plurality of hydroxyl, primary amine and/or secondary amine groups in the presence of high molecular weight polyols. These polymer filled polyols are also known to be suitable in preparing slabstock and molded foams.

U.S. Pat. No. 7,678,840 discloses reactive systems for cavity filling NVH polyurethane foams which have reduced MDI emissions. These reactive systems comprise a polymethylene poly(phenylisocyanate) having polymeric and monomeric contents within the specified ranges, and isomeric MDI contents within the specified ranges; with an isocyanate-reactive component; in the presence of at least one catalyst and water. A suitable isocyanate-reactive component as described in the working examples comprise a polyol blend having an average molecular weight of about 6425 and an average functionality of about 3.1, which comprised at least one polymer polyol having about 43% SAN solids and at least one amine-initiated polyether polyol.

As discussed above, PHD polyols, PIPA polyols and SAN polymer polyols are all well known in the field of polyurethane chemistry. It is also common knowledge that polyurethane foams may be prepared from these various types of polymer modified polyols. There continues to be a need for further improvements in foam properties, particularly flammability, VOC reduction, etc.

The novel hybrid polymer polyols of the present invention offer distinct advantages that are not available from the present commercially available polymer polyols. These include improved flammability in foams prepared from these novel polymer polyols, and lower VOCs (volatile organic compounds) present in the foams compared to the present commercially available polymer polyols. It was surprisingly found that these advantages could be realized in polymer polyols by substituting either a PHD polyol or a PIPA polyol for a portion of or all of the liquid base polyol (typically a polyether polyol) in the composition of the polymer filled polyol. This has not previously been disclosed or suggested.

SUMMARY OF THE INVENTION

This invention relates to hybrid polymer polyols and to a process for the preparation of these hybrid polymer polyols.

More specifically, this invention relates to hybrid polymer polyols that are stable, low-viscosity polymer polyols. These hybrid polymer polyols comprise the free-radical polymerization product of (A) a base polyol component comprising: (1) from 1 to 100% by weight of a polymer modified polyol selected from the group consisting of: (a) one or more dispersions of a polyurea and/or polyhydrazodicarbonamide in a hydroxyl group containing compound and (b) one or more polyisocyanate polyaddition polyols; and (2) from 0 to 99% by weight of a polyol having a functionality of from 2 to 6, and an OH number of from 20 to 500; wherein the sum of the %'s by weight of (A)(1) and (A)(2) totals 100% by weight of component (A); (B) optionally, a preformed stabilizer; and (C) one or more ethylenically unsaturated monomers; in the presence of: (D) a free-radical polymerization initiator; and (E) optionally, a polymer control agent; wherein the solids content of the hybrid polymer polyol ranges from 20 to 70% by weight, and comprises (i) from 1% to 60% by weight of polyureas and/or polyhydrazodicarbonamides or polyisocyanate polyaddition products, and (ii) from 40% to 99% by weight of graft copolymers comprising the ethylenically unsaturated monomers, with the sum of the %'s by weight of (i) and (ii) totaling 100% by weight of the solids in the hybrid polymer polyol.

These hybrid polymer polyols are prepared by free-radically polymerizing: (A) a base polyol component comprising: (1) from 1 to 100% by weight of a polymer modified polyol selected from the group consisting of: (a) one or more dispersions of a polyurea and/or polyhydrazodicar-bonamide in a hydroxyl group containing compound and (b) one or more polyisocyanate polyaddition polyols; and (2) from 0 to 99% by weight of a polyol having a functionality of from 2 to 6, and an OH number of from 20 to 500; wherein the sum of the %'s by weight of (A)(1) and (A)(2) totals 100% by weight of component (A); (B) optionally, a preformed stabilizer; and (C) one or more ethylenically unsaturated monomers; in the presence of: (D) a free-radical polymerization initiator; and (E) optionally, a polymer control agent; wherein the resultant hybrid polymer polyol has a solids content of from 20 to 70% by weight, which comprises (i) from 1% to 60% by weight of polyureas and/or polyhydrazodicarbonamides or polyisocyanate polyaddition products, and (ii) from 40% to 99% by weight of graft copolymers comprising the ethylenically unsaturated monomers, with the sum of the %'s by weight of (i) and (ii) totaling 100% by weight of the solids in the hybrid polymer polyol Another aspect of the present invention relates to foams which comprise these hybrid polymer polyols. These foams comprise the reaction product of a polyisocyanate component with an isocyanate-reactive component which comprises the hybrid polymer polyols described herein.

Another aspect of this invention is a process for the preparation of foams from these polymer polyols. This process comprises reacting a polyisocyanate component with an isocyanate-reactive component comprising the hybrid polymer polyols herein, in the presence of a blowing agent and at least one catalyst, under suitable conditions to form polyurethane foam. These polyurethane foams comprise the reaction product of a polyisocyanate component with an isocyanate-reactive component that comprises the hybrid polymer polyols of the present invention, in the presence of a blowing agent and at least one catalyst.

DETAILED DESCRIPTION OF THE INVENTION

Except in the operating examples, or where otherwise indicated, all numbers expressing quantities, percentages, OH numbers, functionalities and so forth in the specification are to be understood as being modified in all instances by the term "about."

All ranges as set forth herein are intended to be inclusive of the end points unless expressly stated otherwise.

As used herein, the following terms shall have the following meanings.

The term "monomer" means the simple unpolymerized form of chemical compound having relatively low molecular weight, e.g., acrylonitrile, styrene, methyl methacrylate, and the like.

The phrase "free radically polymerizable ethylenically unsaturated monomer" means a monomer containing ethylenic unsaturation (>C=C<, i.e. two double bonded carbon atoms) that is capable of undergoing free radically induced addition polymerization reactions.

The term "pre-formed stabilizer" is defined as an intermediate obtained by reacting a macromer containing reactive unsaturation (e.g. acrylate, methacrylate, maleate, etc.) with monomers (i.e. acrylonitrile, styrene, methyl methacrylate, etc.), optionally, in a polymer control agent, PCA, (i.e. methanol, isopropanol, toluene, ethylbenzene, etc.) and/or optionally, in a polyol, to give a co-polymer (dispersion having e.g. a low solids content (e.g. <20%), or soluble grafts, etc.).

The term "stability" means the ability of a material to maintain a stable form such as the ability to stay in solution or in suspension.

The phrase "polymer polyol" refers to a stable dispersion of polymeric solids (preferably styrene/acrylonitrile solids) in a polyol composition, and is typically produced by polymerizing one or more ethylenically unsaturated monomers in a base polyol in the presence of a free radical catalyst to form a stable dispersion of polymer particles in the polyol. These polymer polyols have the valuable property of imparting to, for example, polyurethane foams and elastomers produced therefrom, higher load-bearing properties than are provided by the corresponding unmodified polyols.

As used herein, the term "hybrid polymer polyol" refers to a polymer polyol which contains two different types of solids, one of which comprises dispersions of ethylenically unsatured monomers such as SAN (styrene/acrylonitrile) solids and one of which comprises dispersions of polyureas and/or dispersions of polyhydrazodicarbonamides. These hybrid polymer polyols are also stable dispersions of the two different types of solids in a base polyol component.

As used herein "viscosity" is in centistokes (cSt) measured at 25° C. on a Cannon Fenske viscometer.

As used herein, the term "molecular weight" refers to the number average molecular weight unless specified otherwise.

In accordance with the present invention, the base polyol component herein comprises
(1) from 1 to 100% (preferably from 2 to 80%, more preferably from 5 to 50%, and most preferably from 10 to 30%) by weight of a polymer modified polyol selected from the group consisting of
   (a) one or more polyureas and/or polyhydrazodicarbonamides in a hydroxyl group containing compound and
   (b) one or more polyisocyanate addition polyols;
and
(2) from 0 to 99% (preferably from 20 to 98%, more preferably from 50 to 95%, and most preferably from 70 to 90%) by weight of a polyol having a functionality of from 2 to 6 (preferably 2 to 4, more preferably from 2 to 3), and an OH number of from 20 to 500 (preferably 25 to 300, more preferably from 30 to 150);
wherein the sum of the %'s by weight of (A)(1) and (A)(2) totals 100% by weight of component (A).

Suitable polyureas and/or polyhydrazodicarbonamides in a hydroxyl group containing compound include the reaction products of (1) at least one organic polyisocyanate, with (ii) one or more amine functional compounds selected from the group consisting of primary and/or secondary amino-group containing di- and/or polyamines, hydrazines, hydrazides and mixtures thereof; in a hydroxyl group containing compound. Such PHD polyols are known and described in, for example, U.S. Pat. Nos. 4,089,835, 4,761,434, 4,847,320 and 5,342,855, the disclosures of which are hereby incorporated by reference.

A preferred PHD polyol for the present invention comprises the reaction product of toluene diisocyanate and hydrazine hydrate in a polyether polyol having a functionality of 3 and an OH number of about 35 that is prepared by alkoxylating glycerin with propylene oxide and ethylene oxide. This PHD polyol has a functionality of 3 and an OH number of 28.

Suitable PIPA polyols include those polymer modified polyols comprising the reaction product of an isocyanate component with an olamine, preferably an alkanolamine, in the presence of a polyol. Suitable PIPA polyols for the present invention are known and disclosed in, for example, U.S. Pat. Nos. 4,374,209 and 5,292,778, the disclosures of which are hereby incorporated by reference.

Components (1) and (2) of (A) the base polyol are considered to be mutually exclusive of one another for purposes of the present invention.

Suitable polyols to be used as component (2) of the base polyol component in the present invention include, for example, polyether polyols. Suitable polyether polyols include those having a functionality of at least about 2, and more preferably at least about 3. The functionality of suitable polyether polyols is less than or equal to about 6, preferably less than or equal to about 5, and most preferably less than or equal to about 4. The suitable polyether polyols may also have functionalities ranging between any combination of these upper and lower values, inclusive. The OH numbers of suitable polyether polyols is at least about 20, preferably at least about 25, more preferably at least about 30 and most preferably at least about 35. Polyether polyols typically also have OH numbers of less than or equal to about 500, preferably less than or equal to about 300, more preferably less than or equal to about 150 and most preferably less than or equal to about 70. The suitable polyether polyols may also have OH numbers ranging between any combination of these upper and lower values, inclusive.

The suitable polyether polyols may also have functionalities ranging from about 2 to about 6, preferably from about 2 to about 5, and most preferably from about 3 to about 4; and OH numbers ranging from about 20 to 500, preferably from about 25 to about 300, more preferably from about 30 to about 150, and most preferably from about 35 to about 70.

As used herein, the hydroxyl number is defined as the number of milligrams of potassium hydroxide required for the complete hydrolysis of the fully phthalylated derivative prepared from 1 gram of polyol. The hydroxyl number can also be defined by the equation:

$$OH = (56.1 \times 1000 \times f)/\text{mol. wt.}$$

wherein:
OH: represents the hydroxyl number of the polyol,
f: represents the functionality of the polyol, i.e. the average number of hydroxyl groups per molecule of polyol,
and
mol. wt. represents the number average molecular weight of the polyol.

Examples of such compounds include polyoxyethylene glycols, triols, tetrols and higher functionality polyols, polyoxypropylene glycols, trials, tetrols and higher functionality polyols, mixtures thereof, etc. When mixtures as used, the ethylene oxide and propylene oxide may be added simultaneously or sequentially to provide internal blocks, terminal blocks or random distribution of the oxyethylene groups and/or oxypropylene groups in the polyether polyol. Suitable starters or initiators for these compounds include, for example, ethylene glycol, propylene glycol, diethylene glycol, dipropylene glycol, tripropylene glycol, trimethyol-propane, glycerol, pentaerythritol, sorbitol, sucrose, ethylenediamine, toluene diamine, etc. By alkoxylation of the starter, a suitable polyether polyol for the base polyol component can be formed. The alkoxylation reaction may be catalyzed using any conventional catalyst including, for example, potassium hydroxide (KOH) or a double metal cyanide (DMC) catalyst.

Other suitable polyols for the base polyol of the present invention include alkylene oxide adducts of non-reducing sugars and sugar derivatives, alkylene oxide adducts of phosphorus and polyphosphorus acids, alkylene oxide adducts of polyphenols, polyols prepared from natural oils such as, for example, castor oil, etc., and alkylene oxide adducts of polyhydroxyalkanes other than those described above.

Illustrative alkylene oxide adducts of polyhydroxyalkanes include, for example, alkylene oxide adducts of 1,3-dihydroxypropane, 1,3-di-hydroxybutane, 1,4-dihydroxybutane, 1,4-, 1,5- and 1,6-dihydroxyhexane, 1,2-, 1,3-, 1,4- 1,6- and 1,8-dihydroxyoctane, 1,10-dihydroxydecane, glycerol, 1,2,4-trihydroxybutane, 1,2,6-trihydroxyhexane, 1,1,1-trimethyl-olethane, 1,1,1-trimethylolpropane, pentaerythritol, caprolactone, polycaprolactone, xylitol, arabitol, sorbitol, mannitol, and the like.

Other polyols which can be employed include the alkylene oxide adducts of non-reducing sugars, wherein the alkoxides have from 2 to 4 carbon atoms. Non-reducing sugars and sugar derivatives include sucrose, alkyl glycosides such as methyl glycoside, ethyl glucoside, etc. glycol glucosides such as ethylene glycol glycoside, propylene glycol glucoside, glycerol glucoside, 1,2,6-hexanetriol glucoside, etc. as well as alkylene oxide adducts of the alkyl glycosides as disclosed in U.S. Pat. No. 3,073,788, the disclosure of which is herein incorporated by reference.

Other suitable polyols include the polyphenols and preferably the alkylene oxide adducts thereof wherein the alkylene oxides have from 2 to 4 carbon atoms. Among the polyphenols which are suitable include, for example bisphenol A, bisphenol F, condensation products of phenol and formaldehyde, the novolac resins, condensation products of various phenolic compounds and acrolein, including the 1,1,3-tris (hydroxy-phenyl)propanes, condensation products of various phenolic compounds and glyoxal, glutaraldehyde, other dialdehydes, including the 1,1,2,2-tetrakis (hydroxyphenol) ethanes, etc.

The alkylene oxide adducts of phosphorus and polyphosphorus acid are also useful polyols, These include ethylene oxide, 1,2-epoxy-propane, the epoxybutanes, 3-chloro-1,2-epoxypropane, etc. as preferred alkylene oxides. Phosphoric acid, phosphorus acid, the polyphosphoric acids such as, tripolyphosphoric acid, the polymetaphosphoric acids, etc. are desirable for use herein.

It should also be appreciated that blends or mixtures of various useful polyols may be used if desired. With polyols other than the preferred type, useful monomer contents and monomer or monomers may vary somewhat. Similarly, it may be desirable or even necessary to modify the stabilizer of this invention when such other polyols are used. This can be accomplished by following the criteria discussed hereinafter in connection with the stabilizers used for the preferred polyols.

In accordance with the present invention, a preformed stabilizer is optionally present during the free-radical polymerization of a base polyol component with one or more ethylenically unsaturated monomers. Suitable preformed stabilizers for the present invention include those which are known in the art and include without limitation those described in the references discussed herein. Preferred preformed stabilizers include those described in, for example, U.S. Pat. No. 4,148,840 (Shah), U.S. Pat. No. 5,196,476 (Simroth), U.S. Pat. No. 5,364,906 (Critchfield) U.S. Pat. No. 5,990,185 (Fogg), U.S. Pat. No. 6,013,731 (Holeschovsky et al), U.S. Pat. No. 7,179,882 (Adkins, et al), and U.S. Pat. No. 6,455,603 (Fogg), the disclosures of which are herein incorporated by reference. Preferred preformed stabilizer compositions for the present invention are those disclosed in U.S. Pat. No. 7,179,882 at column 8, line 21 through column 13, line 36, the disclosure of which is herein incorporated by reference.

Suitable compounds to be used as the ethylenically unsaturated monomers, i.e. component (C) the present invention include, for example, those ethylenically unsaturated monomers described above with respect to the preformed stabilizer. Suitable monomers include, for example, aliphatic conjugated dienes such as butadiene and isoprene; monovinylidene aromatic monomers such as styrene, α-methyl-styrene, (t-butyl)styrene, chlorostyrene, cyanostyrene and bromostyrene; α,β-ethylenically unsaturated carboxylic acids and esters thereof such as acrylic acid, methacrylic acid, methyl methacrylate, ethyl acrylate, 2-hydroxyethyl acrylate, butyl acrylate, itaconic acid, maleic anhydride and the like; α,β-ethylenically unsaturated nitriles and amides such as acrylonitrile, methacrylonitrile, acrylamide, methacrylamide, N,N-dimethyl acrylamide, N-(dimethylaminomethyl)acrylamide and the like; vinyl esters such as vinyl acetate; vinyl ethers, vinyl ketones, vinyl and vinylidene halides as well as a wide variety of other ethylenically unsaturated materials which are copolymerizable with the aforementioned monomeric adduct or reactive monomer. It is understood that mixtures of two or more of the aforementioned monomers are also suitable employed in making the pre-formed stabilizer. Of the above monomers, the monovinylidene aromatic monomers, particularly styrene, and the ethylenically unsaturated nitriles, particularly acrylonitrile are preferred. In accordance with this aspect of the present invention, it is preferred that these ethylenically unsaturated monomers include styrene and its derivatives, acrylonitrile, methyl acrylate, methyl methacrylate, vinylidene chloride, with styrene and acrylonitrile being particularly preferred monomers.

It is preferred that styrene and acrylonitrile are used in sufficient amounts such that the weight ratio of styrene to acrylonitrile (S:AN) is from about 80:20 to 20:80, more preferably from about 75:25 to 25:75. These ratios are suitable for polymer polyols and the processes of preparing them, regardless of whether they comprise the ethylenically unsaturated macromers or the pre-formed stabilizers of the present invention.

In accordance with the present invention, the novel hybrid polymer polyols herein will have a total solids content in the range of from 20 to 70% by weight, preferably from 25 to 65% and more preferably from 30 to 60% by weight. The total solids content comprises (i) from 1 to 60% (preferably from 3 to 55%, more preferably from 5 to 50%) by weight of polyureas, and/or PHD or polyisocyanate polyaddition (PI PA) products; and (ii) from 40 to 99% (preferably from 45 to 97%, more preferably from 50 to 95%) by weight of graft copolymers comprising the one or more ethylenically unsaturated monomers, with the sum of the %'s by weight of (i) and (ii) totaling 100% by weight of the total solids content present in the hybrid polymer polyol.

Examples of free radical initiators suitable as component (D) of the present invention include initiators such as, for example, peroxides including both alkyl and aryl hydroperoxides, persulfates, perborates, percarbonates, azo compounds, etc. Some specific examples include catalysts such as hydrogen peroxide, di(t-butyl)peroxide, t-butylperoxy diethyl acetate, t-butyl peroctoate, t-butyl peroxy isobutyrate, t-butyl peroxy 3,5,5-trimethyl hexanoate, t-butyl perbenzoate, t-butyl peroxy pivalate, t-amyl peroxy pivalate, t-butyl peroxy-2-ethyl hexanoate, lauroyl peroxide, cumene hydroperoxide, t-butyl hydroperoxide, azobis(isobutyronitrile), 2,2'-azo bis-(2-methylbutyronitrile), etc.

The quantity of free-radical initiator used herein is not critical and can be varied within wide limits. In general, the amount of initiator ranges from about 0.01 to 2% by weight, based on 100% by weight of the final polymer polyol. Increases in catalyst concentration result in increases in monomer conversion up to a certain point, but past this, further increases do not result in substantial increases in conversion. The particular catalyst concentration selected will usually be an optimum value, taking all factors into consideration including costs.

Polymer control agents, component (E), are optionally present in the stable, low viscosity hybrid polymer polyols herein. Suitable polymer control agents (PCA's) for the present invention include, for example, those which are known to be useful in polymer polyols and in the processes of preparing polyols such as those described in, for example, U.S. Pat. Nos. 3,953,393, 4,119,586, 4,463,107, 5,324,774, 5,814,699, 7,179,882 and 6,624,209, the disclosures of which are herein incorporated by reference. Some examples of suitable compounds to be used as polymer control agents include various mono-ols (i.e. monohydroxy alcohols), aromatic hydrocarbons, ethers, and other liquids.

Polymer control agents are also commonly referred to as reaction moderators. These are known to control the molecular weight of the polymer polyol. As long as the compound used as the polymer control agent does not adversely affect the performance of the polymer polyol, it is suitable for use in the practice of the invention. Preferred are the mono-ols because of their ease of stripping from the final polymer/polyol composition. Mixtures of one or more mono-ols may be used as polymer control agents. The choice of mono-ol is not narrowly critical. It should not form two phases at reaction conditions and should be readily stripped from the final hybrid polymer/polyol.

Suitable polymer control agents include, for example, one or more mono-ol which is typically an alcohol containing at least one carbon atom, such as methanol, ethanol, n-propanol, iso-propanol, n-butanol, sec.-butanol, t-butanol, n-pentanol, 2-pentanol, 3-pentanol, allyl alcohol, and the like, and mixtures of the same. The preferred mono-ol is isopropanol. Other known polymer control agents include compounds such as, for example, ethylbenzene and toluene. In accordance with the present invention, the most preferred polymer control agents include isopropanol, ethanol, tert-butanol, toluene, ethylbenzene, etc.

Polymer control agents can be used in substantially pure form (i.e. as commercially available) or can be recovered in crude form from the polymer polyol process and reused as-is. For instance, if the polymer control agent is isopropanol, it can be recovered from the polymer polyol process and used at any point in a subsequent product campaign in which the isopropanol is present (i.e. such as the production of PFS A and PFS B in Table 1 of U.S. Pat. No. 7,179,882, the disclosure of which is hereby incorporated by reference). The amount of crude polymer control agent in the total polymer control agent can range anywhere from 0% up to 100% by weight.

The total amount of polymer control agent (PCA) present in the polymer polyols of the present invention ranges from greater than about 3.0% to about 20% (preferably from 4.0 to 15%, more preferably from 5 to 10%) by weight, based on the total weight of the polymer polyol.

The quantity of polymer control agent to be employed in the present invention is greater than about 3.0% by weight, preferably at least about 3.5%, more preferably at least about 4.0% and most preferably at least about 5.0% by weight, based on the 100% by weight of all components which comprise the polymer polyol, prior to stripping the product, (i.e. components (A), (B), (C), (D) and (E)). The quantity of total polymer control agent is also employed in amounts of less than or equal to 20% by weight, preferably less than or equal to about 15%, more preferably less than or equal to 10% and most preferably less than or equal to about 7% by weight, based on the total weight of all components charged to the reactor. The amount of total polymer control agent may be employed in any amount ranging between any combination of these lower and upper values.

In addition, the hybrid polymer polyol and the process of preparing the hybrid polymer polyol may optionally comprise a chain transfer agent. The use of chain transfer agents and their nature is known in the art. Examples of suitable materials include compounds such as mercaptans including, e.g. dodecane thiol, ethane thiol, octane thiol, toluene thiol, etc., halogenated hydrocarbons such as, e.g. carbon tetrachloride, carbon tetrabromide, chloroform, etc., amines such as diethylamine, enol-ethers, etc. If used at all in the present invention, a chain transfer agent is preferably used in an amount of from about 0.1 to about 2 wt. %, more preferably from about 0.2 to about 1 wt. %, based on the total weight of the hybrid polymer polyol (prior to stripping).

The hybrid polymer polyols herein are preferably produced by utilizing a low monomer to polyol ratio which is maintained throughout the reaction mixture during the process. This is achieved by employing conditions that provide rapid conversion of monomer to polymer. In practice, a low monomer to polyol ratio is maintained, in the case of semi-batch and continuous operation, by control of the temperature and mixing conditions and, in the case of semibatch operation, also by slowly adding the monomers to the polyol.

The temperature range is not critical and may vary from about 100° C. to about 140° or perhaps greater, the preferred range being from 115° C. to 125° C. As has been noted herein, the catalyst and temperature should be selected so that the catalyst has a reasonable rate of decomposition with respect to the hold-up time in the reactor for a continuous flow reactor or the feed time for a semi-batch reactor.

The mixing conditions employed are those obtained using a back mixed reactor (e.g. —a stirred flask or stirred autoclave). The reactors of this type keep the reaction mixture relatively homogeneous and so prevent localized high monomer to polyol ratios such as occur in tubular reactors when such reactors are operated with all the monomer added to the beginning of the reactor. In addition, more efficient mixing can be obtained by the use of an external pump around loop on the reactor section. For instance, a stream of reactor contents may be removed from the reactor bottom via external piping and returned to the top of the reactor (or vice versa) in order to enhance internal mixing of the components. This external loop may contain a heat exchanger if desired.

The foams of the invention comprise the reaction product of a polyisocyanate, with an isocyanate-reactive component comprising the novel hybrid polymer polyols described herein, in the presence of a blowing agent and at least one catalyst. In addition, crosslinking agents, chain extenders, surfactants, and other additives and auxiliary agents known to be useful in preparing foams may also be present.

The process of preparing the foams comprises reacting a polyisocyanate component, with an isocyanate-reactive component comprising the novel hybrid polymer polyols herein, in the presence of a blowing agent and at least one catalyst. In addition, crosslinking agents, chain extenders, surfactants, and other additives and auxiliary agents may also be present.

Suitable polyisocyanates comprise those known in the art, particularly aromatic polyisocyanates such as, for example, toluene diisocyanate, diphenylmethane diisocyanate, etc. These are known in the field of polyurethane chemistry.

The isocyanate-reactive component may comprise 100% by weight of the novel hybrid polymer polyols described herein. It may also comprise from 0 to 95% by weight of a conventional isocyanate-reactive component such as, for example, a polyoxyalkylene polyol, a polyether polyol, a polyester polyol, etc. Lower molecular weight isocyanate-reactive components such as crosslinkers and/or chain extenders may also be present.

In accordance with the present invention, foams (preferably molded foams) may be prepared from an isocyanate-reactive component that comprises (1) from 5 to 100% (preferably from 10 to 75%, more preferably from 15 to 70%, most preferably from 20 to 65% and most particularly preferably from 25 to 50%) by weight of the hybrid polymer polyol described herein, and (2) from 0 to 95% (preferably from 25 to 90%, more preferably from 30 to 85%, most preferably from 35 to 80% and most particularly preferably from 50 to 75%) by weight of a conventional isocyanate-reactive component such as a polyether polyol, a polyester polyol, a polyoxyalkylene polyol, etc. The sum of the %'s by weight of components (1) and (2) totals 100% by weight of the isocyanate-reactive component used to prepare the foams herein.

Water is the preferred blowing agent. However, virtually any other known blowing agent may also be used.

Suitable catalysts include, for example, amine catalysts, tin catalysts, and other catalysts known to be suitable for preparing polyurethanes.

The following examples further illustrate details for the preparation and use of the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all parts and percentages are parts by weight and percentages by weight, respectively.

EXAMPLES

The following components were used in the working examples of this invention.

Polyol A: A glycerine initiated polyether polyol produced by reacting propylene oxide and ethylene oxide in the presence of a potassium catalyst and refining to remove the catalyst. The polyol has a hydroxyl number of about 35, an EO content of about 20%, and a viscosity of about 865 cSt, Polyol B: A glycerine initiated polyether polyol produced by reacting propylene oxide and ethylene oxide in the presence of a potassium catalyst and refining to remove the catalyst. The polyol has a hydroxyl number of about 60, an EO content of about 17%, and a viscosity of about 460 cSt.

Polyol C: a propylene glycol initiated polyether polyol produced by reacting propylene oxide and ethylene oxide in the presence of a potassium hydroxide catalyst and refining to remove the catalyst. This polyol has a hydroxyl number of about 40, a functionality of about 2, an EO content of about 16%, and a viscosity of about 520 cSt.

Polyol D: a glycerine/sorbitol initiated polyether polyol produced by reacting propylene oxide and ethylene oxide in the presence of a potassium catalyst and refining to remove the catalyst. This polyol has a hydroxyl number of about 31.5, a functionality of about 2.9, an EO content of about 17-18%, and a viscosity of about 1400 cSt PHD Polyol A: a dispersion of a polyhydrazodicarbonamide in a hydroxyl group containing compound, prepared by reacting hydrazine hydrate with toluene diisocyanate, in the presence of Polyol A, having a functionality of about 3, an OH number of about 28, and a solids content of about 20%

SAN PMPO Z: a dispersion of styrene/acrylonitrile in Polyol A having a solids content of 43%, a functionality of 3, and an OH number of about 20

SAN: Styrene:acrylonitrile in a weight ratio of 63.5 to 36.5

AIBN: 2,2'-Azobisisobutyronitrile, a free-radical polymerization initiator commercially available as VAZO 64 from E.I. Du Pont de Nemours and Co.

Iso A: toluene diisocyanate comprising 80% by weight of the 2,4-isomer and 20% by weight of the 2,6-isomer DEOA-LF: a mixture of 85% by weight diethanolamine and 15% by weight of water Catalyst A: an amine catalyst, commercially available from Momentive Performance Materials as NIAX A-1

Catalyst B: an amine catalyst, commercially available from Air Products as DABCO 33LV DC 5164: a silicon surfactant commercially available as DC 5164

DC 5169: a silicon surfactant commercially available as DC 5169

Viscosity: Viscosities were measured by Cannon Fenske viscometer (cSt)

Polymer Polyol Preparation

This series of examples relates to the preparation of polymer polyols. Unless otherwise indicated, all hybrid polymer polyols were made similar to Polymer Polyol A1 from Table 2A of U.S. Pat. No. 7,179,882, the disclosure of which is hereby incorporated by reference in its entirety. Exceptions to this are described herein. Changes to formulations are listed in Table 1.

The polymer polyols were prepared in a two-stage reaction system comprising a continuously-stirred tank reactor (CSTR) fitted with an impeller and 4 baffles (first-stage) and a plug-flow reactor (second stage). The residence time in each reactor was about 60 minutes. The reactants were pumped continuously from feed tanks through an in-line static mixer and then through a feed tube into the reactor, which was well mixed. The temperature of the reaction mixture was controlled at approximately 115° C. The product from the second-stage reactor overflowed continuously through a pressure regulator designed to control the pressure in each stage at 45 psig. The polymer polyol then passed through a cooler and into a collection vessel. The crude product was vacuum stripped to remove volatiles. The wt-% total polymer in the product was calculated from the concentrations of known solids in the base polyol feed, the total monomer feed, and the amount of residual unsaturated monomers measured in the crude polymer polyol before stripping.

Preformed stabilizers A and B which are described in Table 1 of U.S. Pat. No. 7,179,882, the entirety of which is incorporated by reference, were used to produce the hybrid polymer polyols. The basic formulations for Polymer Polyols A, B, C and D correspond essentially to the formulation of Polymer Polyol A1 in TABLE 2A of U.S. Pat. No. 7,179,882, the disclosure of which is herein incorporated by reference, with the exceptions listed in Table 1 below. The base polyol components and the solids contents for each of Polymer Polyols A, B, C and D are as described in Table 1 below.

Table 1 shows the composition of Polymer Polyols A, B, C and D.

TABLE 1

Polymer Polyol Formulations and Properties:

| Polymer Polyol[1] | Base Polyol | Wt % PFS | Wt. % total Solids | Viscosity (cSt) |
|---|---|---|---|---|
| PMPO A[2] | 100% PHD Polyol A | 6.9 | 37% total (15% PHD and 22% SAN) | 44,634 |
| PMPO B[2] | 75% Polyol A and 25% PHD Polyol A | 6.9 | 43% total (3% PHD and 40% SAN) | 13,145 |
| PMPO C[2] | 75% Polyol B and 25% PHD Polyol A | 8.3 | 43% total (3% PHD and 40% SAN) | 8,144 |
| PMPO D[3] | 75% Polyol C and 25% PHD Polyol A | 12.5 | 43% total (3% PHD and 40% SAN) | 5,408 |

[1]AIBN wt. % = 0.32 for all PMPOs
[2]PFS A from U.S. Pat. No. 7,179,882
[3]PFS B from U.S. Pat. No. 7,179,882

The physical properties of the foams reported in the examples were measured per the standard procedures described in ASTM D3574-08.

Flexible polyurethane foams were produced by a standard high resilience (HR) "Cold" Molded process. The polyols, water, silicone surfactants, amine catalysts, and any other non-isocyanate additives were added to a cylindrical container fitted with baffles. The contents were mixed at 4000 rpm for 55 seconds with an agitator having two turbine impellers. The mixture was then degassed for 15 seconds. After degassing, the isocyanate component was added and the contents were mixed at 4000 rpm for 5 seconds. The mixture was then poured into a 15×15×4-inch aluminum mold at 65.6 to 711° C. and the reaction was allowed to foam in that mold for a period of 4.5 to 6 minutes. The molded foam was removed from the mold, and allowed to cure at ambient conditions for seven days. These samples were then conditioned for at least 16 hours at standard temperature (~23° C.) and humidity (~50%) before physical properties were tested by ASTM standard procedures.

TABLE 2A

Open Celled Flexible Foams:

| Formulation: | Example 1 | Example 2 | Example 3 |
|---|---|---|---|
| PMPO C | | | 47.4 |
| PHD Polyol A | 100 | | |
| Polyol A | | 52.3 | 52.3 |
| SAN PMPO Z | | 47.7 | |
| Water (distilled) | 3.99 | 4.24 | 4.24 |
| DEOA-LF | 2.35 | 1.73 | 1.73 |
| DC 5164 | 1.5 | 0.9 | 0.9 |
| DC 5169 | 1 | 0.6 | 0.6 |
| Catalyst A | 0.08 | 0.08 | 0.08 |
| Catalyst B | 0.32 | 0.32 | 0.32 |
| Iso A | 53.96 | 51.78 | 52.61 |
| Isocyanate Index | 100 | 100 | 100 |

TABLE 2B

Physical Properties of Open Celled Flexible Foams 1-3:

| Physical Properties/Test Details | Example 1 | Example 2 | Example 3 |
|---|---|---|---|
| IFDM50(1) 25/50 Ifd in Newtons ASTM D3574 B1, size as recv-force required for 25% rest indentation (N) | | 208.1 | 254.4 |
| IFDM50(1) 25/50 Ifd in Newtons ASTM D3574 B1, size as recv-force required for 25% rest return indentation (N) | | 160.1 | 178.7 |
| IFDM50(1) 25/50 Ifd in Newtons ASTM D3574 B1, size as recv-force required for 50% rest indentation (N) | | 365.4 | 436.8 |
| IFDM50(1) 25/50 Ifd in Newtons ASTM D3574 B1, size as recv-hystersis (%) | | 23.06 | 29.77 |
| IFDM50(1) 25/50 Ifd in Newtons ASTM D3574 B1, size as recv-recovery (%) | | 76.94 | 70.23 |
| IFDM50(1) 25/50 Ifd in Newtons ASTM D3574 B1, size as recv-sag factor (NA) | | 1.756 | 1.717 |
| IFDM50(1) 25/50 Ifd in Newtons ASTM D3574 B1, size as recv-thickness (in) | | 3.865 | 4.026 |
| MVS302(CT1) FMVSS 302 Flammability/Burning Rate of Materials-burn rate (mm/min) | 0 | 87.99 | 81.68 |
| MVS302(CT1) FMVSS 302 Flammability/Burning Rate of Materials-length (mm) | 0 | 254 | 122.7 |
| MVS302(CT1) FMVSS 302 Flammability/Burning Rate of Materials-time (s) | 1 | 173.3 | 85.33 |

TABLE 3

Open Cells Foams:

| Formulation: | Example 4 | Example 5 | Example 6 |
|---|---|---|---|
| Polyol D | 50 | 50 | 50 |
| PHD Polyol A | 50 | | |
| PMPO B | | | 25 |
| SAN PMPO Z | | 25 | |
| Polyol A | | 25 | 25 |
| Water (distilled) | 3.116 | 3.24 | 3.24 |
| DEOA-LF | 1.73 | 1.73 | 1.73 |
| DC 5043 | 1.5 | 1.5 | 1.5 |
| Catalyst A | 0.08 | 0.08 | 0.08 |
| Catalyst B | 0.32 | 0.32 | 0.32 |
| Iso A | 42.39 | 42.39 | 42.39 |
| Isocyanate Index | 100 | 100 | 100 |
| Toyota 508G-Test Method-Formaldehyde (μg/sample) | 0.35 | 0.57 | 0.22 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A stable, low-viscosity hybrid polymer polyol comprising the free-radical polymerization product of:
   (A) a base polyol component comprising:
      (1) from 1 to 100% by weight of a polymer modified polyol selected from the group consisting of:
         (a) one or more dispersions of a polyurea and/or polyhydrazodicarbonamide in a hydroxyl group containing compound,
         and
         (b) one or more polyisocyanate polyaddition polyols;
         and
      (2) from 0 to 99% by weight of a polyol having a functionality of from 2 to 6, and an OH number of from 20 to 500;
      with the proviso that said base polyol is not prepared from a natural oil, and wherein the sum of the %'s by weight of (A)(1) and (A)(2) totals 100% by weight of component (A);
   (B) optionally, a preformed stabilizer;
   and
   (C) one or more ethylenically unsaturated monomers;
   in the presence of:
   (D) a free-radical polymerization initiator;
   and
   (E) optionally, a polymer control agent;
   wherein the solids content of the hybrid polymer polyol ranges from 20 to 70% by weight, and comprises (i) from 1% to 60% by weight of polyureas and/or polyhydrazodicarbonamides or polyisocyanate polyaddition products, and (ii) from 40% to 99% by weight of graft copolymers comprising the ethylenically unsaturated monomers, with the sum of the %'s by weight of (i) and (ii) totaling 100% by weight of the solids in the hybrid polymer polyol.

2. The stable, low-viscosity hybrid polymer polyol of claim 1, wherein (A) said base polyol component comprises:
   (1) from 2 to 80% by weight of a polymer modified polyol selected from the group consisting of:
      (a) one or more dispersions of a polyurea and/or polyhydrazodicarbonamide in a hydroxyl group containing compound, and
      (b) one or more polyisocyanate polyaddition polyols;

and
(2) from 20 to 98% by weight of a polyol having a functionality of from 2 to 4 and an OH number of from 25 to 300;

with the proviso that said base polyol is not prepared from a natural oil, and wherein the sum of the %'s by weight of (A)(1) and (A)(2) totals 100% by weight of component (A).

3. The stable, low-viscosity hybrid polymer polyol of claim 1, wherein (A)(1)(a) said one or more dispersions of a polyurea and/or polyhydrazodicarbonamide is the reaction product of (i) at least one organic polyisocyanate, with (ii) one or more amine functional compounds selected from the group consisting of primary and/or secondary amino-group containing di- and/or polyamines, hydrazines, hydrazides and mixtures thereof, in (iii) a hydroxyl group containing compound.

4. The stable, low-viscosity hybrid polymer polyol of claim 3, in which (i) said organic polyisocyanate is toluene diisocyanate, (ii) said amine functional compound is hydrazine hydrate, and (iii) said hydroxyl group containing compound is a polyether polyol having a functionality of about 3 and an OH number of about 35, wherein the resultant polyhydrazodicarbonamide polyol has a functionality of about 3 and an OH number of about 28.

5. The stable, low-viscosity hybrid polymer polyol of claim 1, wherein (C) said one or more ethylenically unsaturated monomers comprise styrene, acrylonitrile or mixtures thereof.

6. The stable, low-viscosity hybrid polymer polyol of claim 5, wherein C) said ethylenically unsaturated monomers comprise a mixture of styrene and acrylonitrile in a weight ratio of about 80:20 to 20:80.

7. The stable, low-viscosity hybrid polymer polyol of claim 1, wherein the solids content of the hybrid polymer polyol ranges from 25 to 65% by weight, and comprises (i) from 3 to 55% by weight of polyureas and/or polyhydrazodicarbonamides or polyisocyanate polyaddition products, and (ii) from 45% to 97% by weight of graft copolymers comprising the ethylenically unsaturated monomers, with the sum of the %'s by weight of (i) and (ii) totaling 100% by weight of the solids in the hybrid polymer polyol.

8. The stable, low-viscosity hybrid polymer polyol of claim 1, which additionally comprises a chain transfer agent.

9. A process for the preparation of a stable, low-viscosity hybrid polymer polyol comprising
(I) free-radically polymerizing:
(A) a base polyol component comprising:
(1) from 1 to 100% by weight of a polymer modified polyol selected from the group consisting of:
(a) one or more dispersions of a polyurea and/or polyhydrazodicarbonamide in a hydroxyl group containing compound
and
(b) one or more polyisocyanate polyaddition polyols;
and
(2) from 0 to 99% by weight of a polyol having a functionality of from 2 to 6, and an OH number of from 20 to 500;
with the proviso that said base polyol is not prepared from a natural oil, and wherein the sum of the %'s by weight of (A)(1) and (A)(2) totals 100% by weight of component (A);
(B) optionally, a preformed stabilizer;
and
(C) one or more ethylenically unsaturated monomers;
in the presence of:
(D) a free-radical polymerization initiator;
and
(E) optionally, a polymer control agent;
wherein the resultant hybrid polymer polyol has a solids content of from 20 to 70% by weight, which comprises (i) from 1% to 60% by weight of polyureas and/or polyhydrazodicarbonamides or polyisocyanate polyaddition products, and (ii) from 40% to 99% by weight of graft copolymers comprising the ethylenically unsaturated monomers, with the sum of the %'s by weight of (i) and (ii) totaling 100% by weight of the solids in the hybrid polymer polyol.

10. The process of claim 9, wherein (A) said base polyol component comprises:
(1) from 2 to 80% by weight of a polymer modified polyol selected from the group consisting of:
(a) one or more dispersions of a polyurea and/or polyhydrazodicarbonamide in a hydroxyl group containing compound, and
(b) one or more polyisocyanate polyaddition polyols;
and
(2) from 20 to 98% by weight of a polyol having a functionality of from 2 to 4 and an OH number of from 25 to 300;
with the proviso that said base polyol is not prepared from a natural oil, and wherein the sum of the %'s by weight of (A)(1) and (A)(2) totals 100% by weight of component (A).

11. The process of claim 9, wherein (A)(1)(a) said one or more dispersions of a polyurea and/or polyhydrazodicarbonamide is the reaction product of (i) at least one organic polyisocyanate, with (ii) one or more amine functional compounds selected from the group consisting of primary and/or secondary amino-group containing di- and/or polyamines, hydrazines, hydrazides and mixtures thereof, in (iii) a hydroxyl group containing compound.

12. The process of claim 11, in which (i) said organic polyisocyanate is toluene diisocyanate, (ii) said amine functional compound is hydrazine hydrate, and (iii) said hydroxyl group containing compound is a polyether polyol having a functionality of about 3 and an OH number of about 35, wherein the resultant polyhydrazodicarbonamide polyol has a functionality of about 3 and an OH number of about 28.

13. The process of claim 9, wherein (C) said one or more ethylenically unsaturated monomers comprise styrene, acrylonitrile or mixtures thereof.

14. The process of claim 13, wherein (C) said ethylenically unsaturated monomers comprise a mixture of styrene and acrylonitrile in a weight ratio of about 80:20 to 20:80.

15. The process of claim 9, wherein the solids content of the hybrid polymer polyol ranges from 25 to 65% by weight, and comprises (i) from 3 to 55% by weight of polyureas and/or polyhydrazodicarbonamides or polyisocyanate polyaddition products, and (ii) from 45% to 97% by weight of graft copolymers comprising the ethylenically unsaturated monomers, with the sum of the %'s by weight of (i) and (ii) totaling 100% by weight of the solids in the hybrid polymer polyol.

16. The process of claim 9, which additionally comprises a chain transfer agent.

17. A process for the preparation of a polyurethane foam, comprising reacting:
(I) a polyisocyanate component,
with
(II) an isocyanate-reactive component comprising the stable, low viscosity hybrid polymer polyol of claim 1:
in the presence of (III) a blowing agent,
and
(IV) at least one catalyst.

18. The process of claim 17, wherein (II) said isocyanate-reactive component comprises (1) from 5 to 100% by weight of the hybrid polymer polyol, and (2) from 0 to 95% by weight of one or more isocyanate-reactive components selected from the group consisting of polyether polyols, polyester polyols, polyoxyalkylene polyols, crosslinking agents, chain extenders and mixtures thereof, with the sum of the %'s by weight of (1) and (2) totaling 100% by weight of component (II).

19. The process of claim 18, wherein (II) said isocyanate-reactive component comprises (1) from 10 to 75% by weight of the hybrid polymer polyol, and (2) from 25 to 75% by weight of one or more isocyanate-reactive components selected from the group consisting of polyether polyols, polyester polyols, polyoxyalkylene polyols, crosslinking agents, chain extenders and mixtures thereof, with the sum of the %'s by weight of (1) and (2) totaling 100% by weight of component (II).

20. The process of claim 17, wherein said process additionally comprises reacting
(V) at least one silicon surfactant.

21. A polyurethane foam comprising the reaction product of:
(I) a polyisocyanate component,
with
(II) an isocyanate-reactive component comprising the stable, low viscosity hybrid polymer polyol of claim 1:
in the presence of
(III) a blowing agent,
and
(IV) at least one catalyst.

22. The foam of claim 21, wherein (II) said isocyanate-reactive component comprises (1) from 5 to 100% by weight of the hybrid polymer polyol, and (2) from 0 to 95% by weight of one or more isocyanate-reactive components selected from the group consisting of polyether polyols, polyester polyols, polyoxyalkylene polyols, crosslinking agents, chain extenders and mixtures thereof, with the sum of the %'s by weight of (1) and (2) totaling 100% by weight of component (II).

23. The foam of claim 22, wherein (II) said isocyanate-reactive component comprises (1) from 10 to 75% by weight of the hybrid polymer polyol, and (2) from 25 to 75% by weight of one or more isocyanate-reactive components selected from the group consisting of polyether polyols, polyester polyols, polyoxyalkylene polyols, crosslinking agents, chain extenders and mixtures thereof, with the sum of the %'s by weight of (1) and (2) totaling 100% by weight of component (II).

24. The foam of claim 21, which additionally comprises
(V) at least one silicon surfactant.

* * * * *